July 20, 1965  E. M. FOUGEA  3,195,207
MOULDING DEVICE FOR ALL MATERIALS, CONCRETE, REINFORCED
CONCRETE, PLASTIC PRODUCTS, CERAMICS AND THE LIKE
Filed Oct. 14, 1963  3 Sheets-Sheet 1

INVENTOR
EDOUARD MARIE FOUGEA
By Irwin S. Thompson
ATTY.

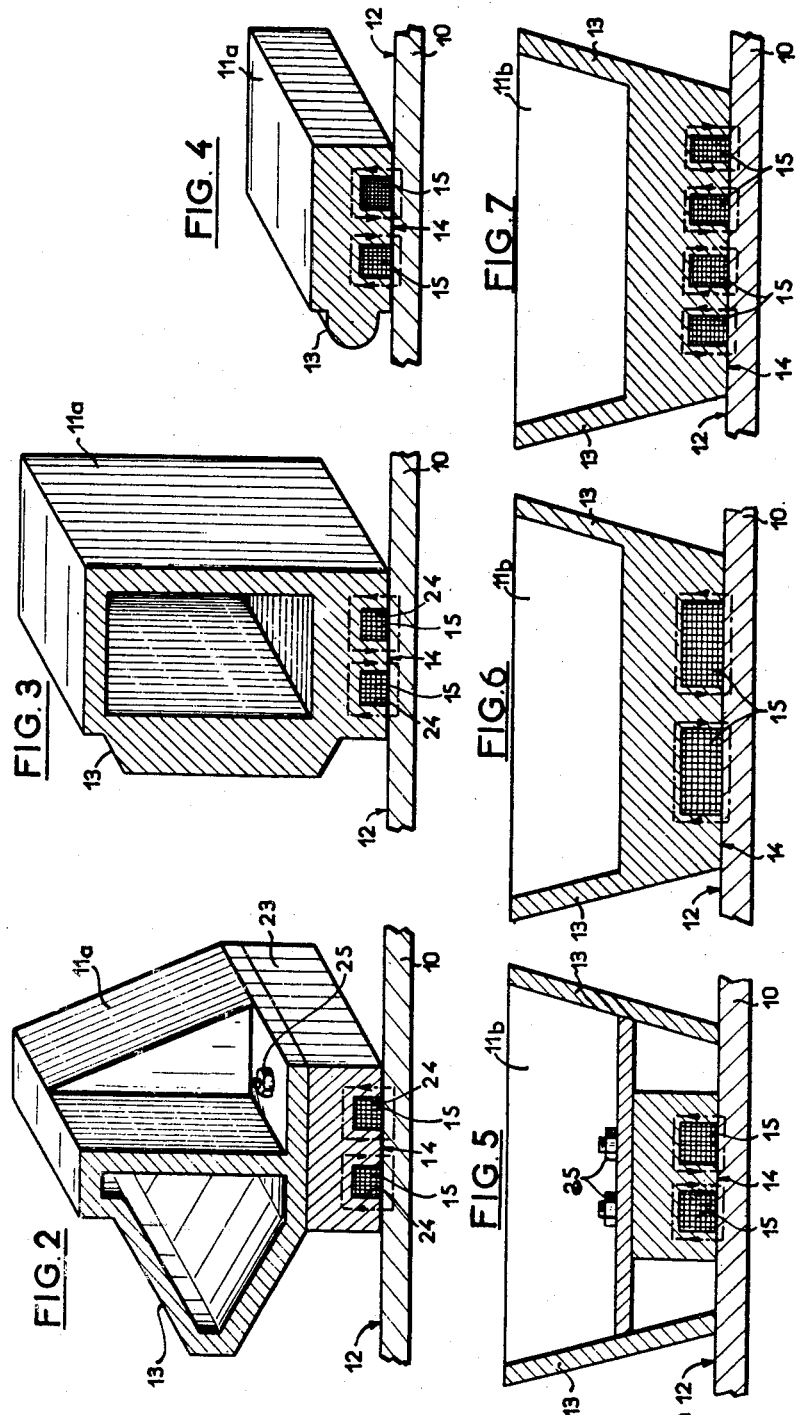

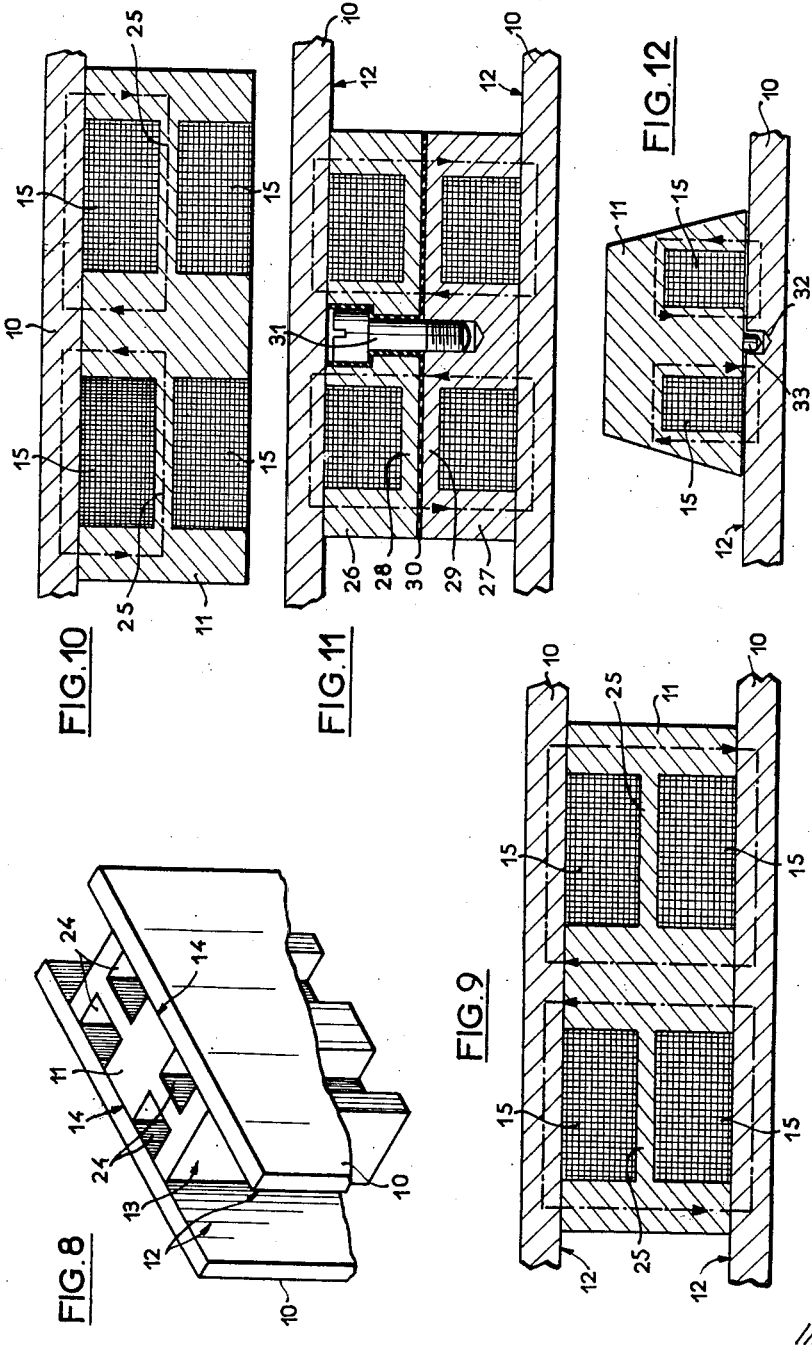

United States Patent Office 3,195,207
Patented July 20, 1965

3,195,207
MOULDING DEVICE FOR ALL MATERIALS, CONCRETE, REINFORCED CONCRETE, PLASTIC PRODUCTS, CERAMICS AND THE LIKE
Edouard Marie Fougea, Neuilly-sur-Seine, France, assignor to Société Anonyme Constructions Edmond Coignet, Paris, France, a corporation of France
Filed Oct. 14, 1963, Ser. No. 315,993
Claims priority, application France, Oct. 15, 1962, 912,254
1 Claim. (Cl. 25—118)

The present invention has for its object a moulding device for all materials (concrete, reinforced concrete, plastic products, ceramics, etc.) especially characterized in that it comprises at least one plate which forms at the same time a moulding wall and a magnetic armature, and at least one element, a first face of which defines a moulding edge, while a second face of the said element forms the pole face of an electro-magnet provided with an energizing coil, the said element being applied by its second face forming the pole face against the said plate which forms an armature in any position selected at will, and is held electro-magnetically in the said position as long as the excitation winding is energized.

This arrangement has the result of permitting great flexibility in the effective fixation of the various members which constitute the mould for the purposes of employment of the product: pouring, vibration, drying, hardening and removal of the moulded product from the moulds and cofferings, together with the elimination of the usual accessories for the erection of the cofferings, such as bolts, studs, keys and their disadvantages: necessity for piercing holes which reduce the mechanical strength, and difficulty of assembly necessitating qualified personnel.

The arrangement according to the invention has the further advantage of permitting convenient provision of the electro-magnetic elements with a very long shape particularly adapted for moulding, especially of concrete, and plastic materials whether reinforced or not. This particular feature is also of considerable advantage as compared with methods of fixing by a single permanent magnet in which the fixed element has necessarily a compact and small size and has its construction made complicated by the means employed for freeing the element.

The elements with magnetic fixing according to the invention may furthermore be quite long, as has been stated above, so as to define all or part of the moulding perimeter, or they may be short or compact so as to be disposed inside the said perimeter in order to provide for openings in the moulded material.

It has already been proposed to fix parts in association by electro-magnetic means, but it should be noted that the invention is distinguished from this technique by the fact that the element which is fixable to the plate has the double function of serving as a moulding wall with its first face and as a magnetic part with its second face, whereas the moulding plate which forms an armature can receive the element in various positions of this latter, and this constitutes a method of application which is particularly well adapted to the moulding of products.

In accordance with the invention, a single plate may be provided and fixed horizontally so as to form a moulding table on which the material is poured flat, or again two plates may be provided vertically side by side and fixed to each other by the elements which comprise double-acting electro-magnets.

Further objects, paritcular features and advantages of the invention will furthermore be brought out from the description which follows below of forms of embodiment given by way of example only, reference being made to the accompanying drawings, in which:

FIGS. 2 to 7 are detail views in cross-section of various elements with electro-magnetic fixation;

FIG. 8 is a perspective view of a corner of a vertical mould comprising two walls assembled together by electro-magnetically fixed elements in accordance with the invention;

FIG. 9 is a view in horizontal section of the same mould as in FIG. 8, the two walls being electro-magnetically fixed to the assembly element;

FIG. 10 is a view similar to that of FIG. 9, but in which only one of the walls remains fixed to the element, while the other wall is removed;

Figure 1:
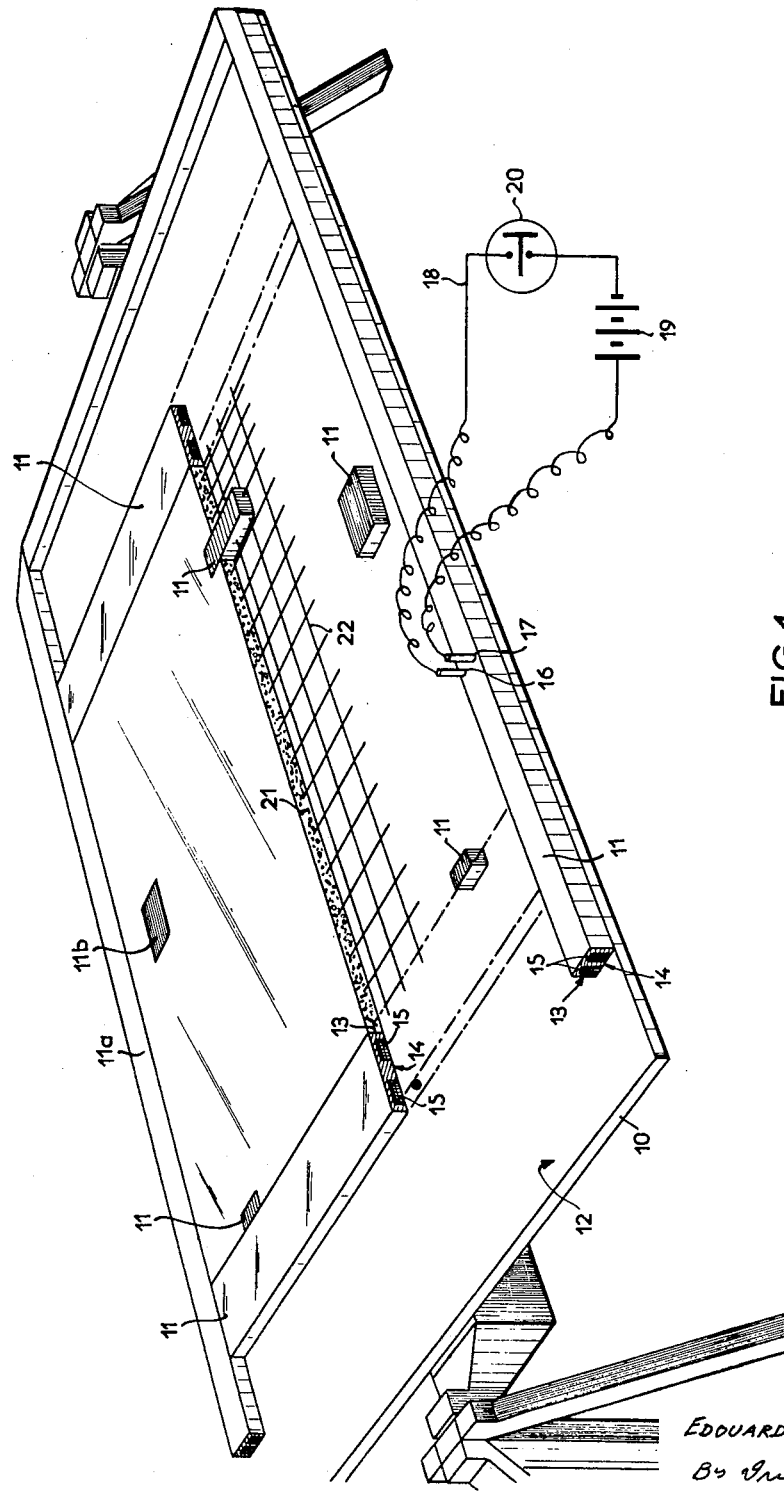
FIG. 1 is a perspective view, with parts in cross-section, of a horizontal moulding table provided with electro-magnetic elements fixed according to the invention.

FIG. 11 relates to an alternative form of the asssembly element for the two walls; and FIG. 12 relates to a further alternative form of construction.

Reference will first be made to FIG. 1. A moulding device according to the invention comprises a plate 10, constituted in this case by a large horizontal metal table, and a number of elements 11 which are arranged on the table 10 and which define therewith the moulding walls 12 and 13. The upper side 12 of the table forms at the same time a moulding surface and an armature face of an electro-magnet. Each element 11 has a first vertical side face 13 which forms a moulding edge, and a second lower horizontal face 14 which constitutes the pole face of an electro-magnet provided with a winding 15.

Each element 11 is applied with its second face 14 against the side 12 of the table 10 in any position selected at will, in order to form the moulding walls 12 and 13 having the desired sizes and shapes.

Each winding 15 has its extremities 16 and 17 connected to an energizing electric circuit 18, comprising a source of current such as storage battery or a generator 19 and a switch 20.

When the switch 20 is closed, the winding 15 is supplied and each element 11 is held electro-magnetically in the selected position on the table 10. The material 21 to be moulded is poured after placing in position an armature, a reinforcement or a support at 22, when so required. The elements 11 can be placed in position and vibrated with risk of displacement relative to the table 10. After drying or setting, the switch 20 is opening, which liberates the elements 11 and permits the moulding to be extracted.

The elements 11 may have various shapes, depending on their position in the moulding wall. They may be long as at 11a when they are arranged at the periphery and form moulding cheeks. They may also have a compact, square, rectangular, polygonal or round shape, as at 11b, when they are arranged inside the moulding perimeter so as to form the desired openings, for example: window openings, various hoppers, holes or housings for the passage of conduits or for embedding electrical apparatus, etc., in the case of concrete elements.

The shape of the slots for the winding 15, and the winding 15 itself, are determined as a function of the adhesion forces necessary to prevent any displacement of the material to be moulded during working and of the admissible electric power. The number of ampere-turns necessary is a function of the different sections of the magnetic circuit, of the size of the air-gaps, including, when so provided, the interior air-gap which ensures the electric insulation, and on the degree of magnetic saturation. Once the number of ampere-turns has been chosen, the section of the winding wires is thereby determined, and the greatest possible number of turns is provided in order to reduce power consumption. In general, the electro-magnets may be provided of extra-mild steel, with a Brinell hardness of the order of 30 to 35, for example, or any other magnetic material. In certain particular cases, especially for parts of small section, the electro-magnets may advantageously be provided of materials having a high permeability.

In the case of a long element 11a (FIG. 2), the electro-magnet is formed over the whole length of the said element, for example by means of core 23 in which are machined the grooves 24 which receive the winding 15, this core 23 being fixed at 25 to the cheek 11a. An assembly of this kind enables the cheek 11a to be changed while keeping the same core 23. In the example shown in FIG. 2, the first face 13 of the element 11a which forms the moulding edge, has a shape with a profile of a V lying on its side.

In an alternative form shown in FIG. 3, the grooves 24 which receive the winding 15 are formed in the cheek 11a itself, the cheek thus forming on its own account a long electro-magnet. In FIG. 3, the first face 13 has a trapezoidal profile, but it could have any other shape, for example that of a half-round section, as shown in FIG. 4.

In the case of a compact element 11b (FIG. 5), for example in the form of a square or rectangular box, there are provided along the whole periphery, or only on two sides, long electro-magnets 15 which permit of indirect fixation at 25 (FIG. 5) or direct fixation (FIG. 6 and FIG. 7). When the dimensions are small, it is also possible to provide the electro-magnet over the whole surface. In the case of round cases and mandrels, the electro-magnet has a round shape and its dimensions are adapted to those of the element. As in the previous cases, the body of the electro-magnet may be independent of the mandrel and removable, or it may be recessed into the mandrel.

Reference will now be made to FIGS. 8 to 10, in which the arrangement is similar to that which has just been described, but in which the mould is such that the material to be moulded is poured between two vertical walls instead of being poured flat on a horizontal table.

In this case, the moulding device in accordance with the invention comprises two parallel vertical plates 10 having moulding sides 12 which face each other.

Each element 11 comprises an edge face 13 which defines the limit of moulding, and two opposite faces 14 which provide an electro-magnetic contact with the sides 12 of the plates 10. As previously, each face 14 comprises grooves 24 which receive the winding 15. In FIG. 8, the winding has been omitted, while in FIGS. 9 and 10 it has been shown.

The fixing of the two plates 10 to each other is effected directly by the elements 11, the winding 15 of which is such that this fixation resists the effects of thrust from the material to be moulded, which is more or less liquid. As previously, certain of the elements 11 may be provided along the moulding perimeter, while others, forming hoppers or mandrels, may be inside the said perimeter.

As can be seen from FIG. 9, in the fixing position the magnetic flux circulates successively through the whole thickness of the elements 11 and the two plates 10. The plates 10 are in contact with the two poles forming the attractive faces of the electro-magnet, and the closure of the mould is ensured.

This application is especially advantageous in the case of small thicknesses. The metal of the element 11 may have a small bulk, since the electro-magnet no longer has a yoke and the core 25 may have a very small thickness or may even be eliminated. This enables the volume of the windings to be increased and thereby permits the electric power necessary to be proportionately reduced.

In practice, for a rectangular moulding, the closure of the mold may be effected by forming a lower cheek and two side cheeks with a double-acting electro-magnets comprising, when so required, a thin metal core 25 (FIG. 9) in the centre of the thickness, and two half-windings 15 mounted back to back, the magnetic effects of which are additive.

In order to close the mould before pouring, the two plates 10 are brought closer together (FIG. 9) and the electro-magnets are energized. For de-moulding, the supply current is cut-off, which frees the two plates 10 and permits the operation of opening. It is also possible to maintain the current in one half-winding (FIG. 10). A reduced flux circulates in one plate 10 and in the central core 25 which then forms a yoke. The cheek 11 then remains fixed on the plate 10 concerned, while the other plate is freed.

Reference will now be made to FIG. 11 which concerns an application of the invention to the case in which the material poured between the plates 10 is to be treated electrically, for example heated by a process utilizing the Joule energy such as the process described in French Patent No. 1,258,277 of February 21, 1960 in the name of the present applicant for "A Method of Accelerated Hardening of Concrete." The double-acting electro-magnet is made in two parts 26 and 27 comprising respectively very thin yokes 28 and 29 fixed back to back with the interposition of an electrical insulator 30. The fixing means, constituted for example by screws 31, are also insulated. The electric insulation between the two metal plates 10 which form the electrodes is ensured, while the magnetic flux continues to circulate through the dielectric material 30 which acts as an air-gap. The magnetic fixing is thus obtained as previously, but necessitates a slight increase of power in the supply to the windings 15.

In some special cases, particularly with elements 11 formed by mandrels of very small dimensions (FIG. 12), the electro-magnetic fixing may be sufficient to resist pull-off forces but insufficient to resist forces tending to cause slip. In this case, the fixation can be improved by means of rod-punch 33 extending into a small recess 32 formed in the plate 10. An arrangement of this kind can be applied equally well to horizontal moulding as in FIG. 1, or to vertical moulding as shown in FIG. 8.

The invention is of course not limited to the forms of construction described and shown but includes all its alternative forms.

What I claim is:

A device for molding parts of concrete, reinforced concrete and other materials, comprising a pair of spaced parallel metal plates forming opposite sides of the mold, and parts disposed between the plates and defining the edges of the mold cavity, there being a plurality of said parts disposed one after the other in contiguous relationship, each of said parts having at least two recesses therein, said at least two recesses opening away from each other one toward each said plate, electromagnets disposed in both of said at least two recesses, the side walls of the recesses enclosing the electromagnets so that the side walls of the recesses rest flat against the associated plate on opposite sides of the electromagnets, each said part being comprised of two sections having a recess in each section, solid dielectric material disposed between the two sections, means releasably retaining the sections together, and electrical conductor means extending through the walls of said recesses for interconnecting the electromagnets with an external electric circuit.

References Cited by the Examiner

UNITED STATES PATENTS

| | | | |
|---|---|---|---|
| 774,007 | 11/04 | Tinstman | 25—121 |
| 807,062 | 12/05 | Coltrin | 25—121 |
| 2,416,559 | 2/47 | Wilson. | |
| 2,672,664 | 3/54 | Sudziarski. | |
| 2,676,504 | 4/54 | Brugge et al. | 248—206 |
| 2,736,937 | 3/56 | Knapp. | |
| 2,757,431 | 8/56 | Williams | 25—121 |

FOREIGN PATENTS 555,421  3/57  Belgium.

WILLIAM J. STEPHENSON, *Primary Examiner.*

ROBERT F. WHITE, MICHAEL V. BRINDSI,

*Examiners.*